United States Patent [19]

Villaveces et al.

[11] Patent Number: 5,188,407
[45] Date of Patent: Feb. 23, 1993

[54] MAGNETIC-STRIP DOOR PROTECTOR FOR AUTOMOBILES

[75] Inventors: James W. Villaveces, 88 Eugenia Dr., Ventura, Calif. 93003; Gordon Muma, Las Vegas, Nev.

[73] Assignee: James Villaveces, Ventura, Calif.

[21] Appl. No.: 822,745

[22] Filed: Jan. 21, 1992

[51] Int. Cl.⁵ ............................................. B60R 19/42
[52] U.S. Cl. ..................................... 293/128; 280/770
[58] Field of Search ............... 293/1, 102, 126, 128, 293/142, 154, 155; 280/770

[56] References Cited

U.S. PATENT DOCUMENTS

| | | | |
|---|---|---|---|
| 4,796,935 | 1/1989 | Maraia | 293/128 |
| 4,828,303 | 5/1989 | Soria | 293/128 |
| 4,871,205 | 10/1989 | Bray | 293/128 |
| 5,060,994 | 10/1991 | Martin et al. | 293/128 |
| 5,072,979 | 12/1991 | Swinton | 293/128 |

Primary Examiner—Dennis H. Pedder
Assistant Examiner—Andrew C. Pike
Attorney, Agent, or Firm—Milton S. Gerstein

[57] ABSTRACT

A magnetic-strip, car-door protector has an elongated, main body portion having an inner layer made of magnetic material for attaching the strip to a car door, and also has a flexible, terminal flap that is inserted in the crack of the door, so that the strip-protector is not able to be pulled out, thereby preventing the theft thereof. In another embodiment, a universal, theft-protecting flap that is slidable along the elongated main body portion is provided, so that it may be adjusted to fit all makes and sizes of cars. The main elongated portion has V-shaped depressions formed along the entire width of both the front and rear surface-faces, whereby the unit may be more readily and easily rolled up and stored.

19 Claims, 2 Drawing Sheets

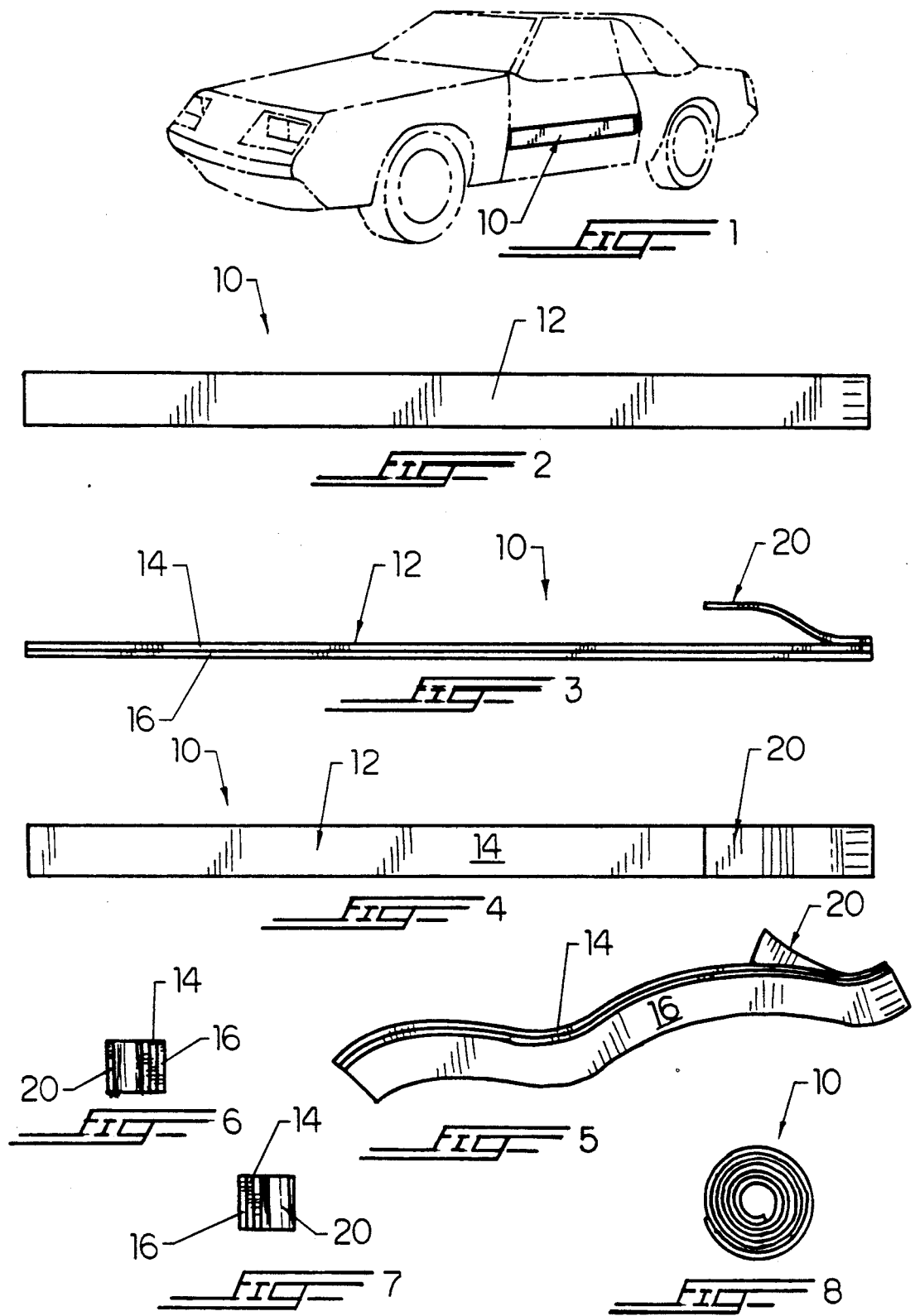

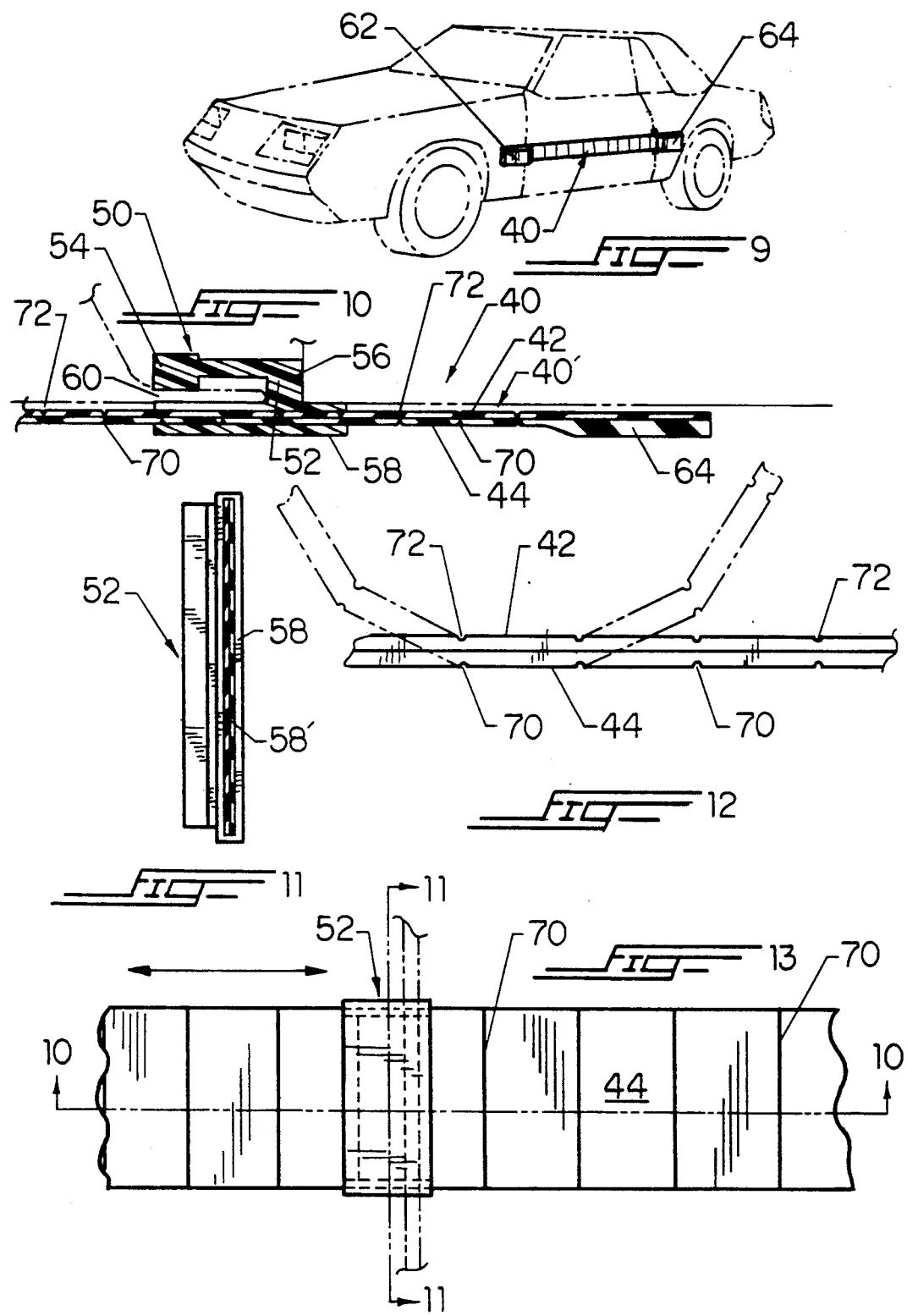

5,188,407

MAGNETIC-STRIP DOOR PROTECTOR FOR AUTOMOBILES

BACKGROUND OF THE INVENTION

The present invention is directed to a strip for protecting a car door from nicks and dents caused when a car is parked in a parking lot, and an adjacent car door is opened against it. Prior art door strip-protectors are known, and are applied to a car door by partially making the strip out of magnetic material. However, these prior art strip-protectors do not prevent against their being stolen when applied to a car door, nor do they store easily and neatly. It is the primary objective of the present invention to provide an improved car door strip-protector that overcomes these problems.

SUMMARY OF THE INVENTION

It is, therefore, the primary objective of the present invention to provide an improved magnetic-strip car door protector that has an elongated main body portion having an inner layer made of magnetic material for attaching the strip to a car door, and also has a flexible, terminal flap that is inserted in the crack of the door, so that the strip protector is not able to be pulled out, thereby preventing the theft thereof.

It is another objective of the invention to provide a universal, theft-protecting flap that is slidable along the elongated main body portion, so that it may be adjusted to fit all makes and sizes of cars.

It is also the objective of the invention to make the main elongated portion more flexible via V-shaped cutouts, whereby the unit may be more readily and easily stored, without any cracking of the material thereof.

BRIEF DESCRIPTION OF THE DRAWINGS

The magnetic-strip, car-door protector of the invention has an elongated, main body portion having an inner layer made of magnetic material for attaching the strip to a car door, and also has a flexible, terminal flap that is inserted in the crack of the door, so that the strip-protector is not able to be pulled out, thereby preventing the theft thereof. In another embodiment, a universal, theft-protecting flap that is slidable along the elongated main body portion is provides, so that it may be adjusted to fit all makes and sizes of cars. The main elongated portion has V-shaped depressions formed along the entire width of both the front and rear surface-faces, whereby the unit may be more readily and easily rolled up and stored.

The invention will be more readily understood with reference to the accompanying drawing, wherein:

FIG. 1 is an isometric view of the MAGNETIC-STRIP DOOR PROTECTOR FOR AUTOMOBILES of the invention shown attached to a door of a car for protecting it against nicks, scratches, and dents;

FIG. 2 is a front view thereof;

FIG. 3 is a top, edge view thereof;

FIG. 4 is a rear view thereof;

FIG. 5 is an isolated isometric view thereof;

FIG. 6 is a first end view thereof;

FIG. 7 is a second end view thereof;

FIG. 8 is a plan view showing the unit rolled up for storage during the nonuse thereof;

FIG. 9 is an isometric view of the second embodiment of the MAGNETIC-STRIP DOOR PROTECTOR FOR AUTOMOBILES of the invention shown attached to a door of a car for protecting it against nicks, scratches, and dents;

FIG. 10 is a top sectional view taken along line 10—10 of FIG. 13 showing the adjustable, slidable theft-protection member;

FIG. 11 is a front sectional view taken along line 11—11 of FIG. 13 thereof;

FIG. 12 is a plan view showing the strip-protector of the invention being bent for storage; and FIG. 13 is a front view showing the adjustable, slidable, theft-protection member.

DETAILED DESCRIPTION OF THE INVENTION

Referring now to the drawings in greater detail, and to FIGS. 1-8 for now, the magnetic-strip car-door protector of the invention is indicated generally by reference numeral 10. The car-door protector 10 has an elongated, main body-portion 12 made up of two layers: A first, inner, or rear, layer 14 made of magnetic material for securing the unit to a car door, and a second, outer, or front, layer 16 made of soft, shock absorbing material, such as rubber, and the like. The inner layer 14 may be made of a material called "FLEXMAG ®" or "ULTRAFEX- ®" manufactured by Flexnag, Inc., of Cincinnati, Ohio, which material is a rubberized-like strip having a matrix of ceramic magnets embedded therein. The two layers are bonded to each other by conventional bonding techniques. The main elongated portion 12 is preferably four feet long and 2½ feet wide. At one end of the portion 12, there is provided a somewhat stiff member 20 that serves as a theft-prevention member, by inserting it in between the edge of the door of a vehicle and the car frame, as best seen in FIG. 1. When the door is closed, the member 20 is sandwiched tight in between the door edge and the car frame, which prevents the unit 10 from being removed without first opening the door. The theft-prevention member 10 may be made of the same material as the outer layer 16 and be formed integral therewith. Alternatively, the member 20 may be a separate piece, such as polyurethane, or the like, that is secured to the end of the main portion 12 by any conventional technique. Since both layers 14 and 16 are flexible, the unit 10 may be rolled up, as seen in FIG. 8, for storage in the car itself.

FIGS. 9-13 show another embodiment 40 of the door protector. The door protector 40 has two layers 42, 44 as in the first embodiment 10. The unit 40 differs from the unit 10 in that the theft-prevention member 50 is made adjustable and slidable along the main, elongated portion 40' of the unit 40. The theft-prevention member 50 is made up of a rubber sleeve 52 having three walls 54, 56, 58, and an entrance opening 60 formed between the walls 54 and 58 that allows the theft-prevention member 50 to be attached to the edge of a car door by receiving a portion of the door edge therein. The wall 58 is provided with a longitudinal through-slot 58' through which is received a portion of the main elongated portion of the unit 40, whereby the theft-prevention member 50 may be positioned at different locations along the unit, as in a slide-rule type manner, for adapting it to different makes, sizes, and models of cars. The ends 62', 64 of the main elongated portion 40' are enlarged, as seen in FIGS. 9 and 10, in order to prevent the main elongated portion 40' from being slid out of the slot 58' of the sleeve 52, when the theft-prevention member 50 is mounted and sandwiched between the edge of the closed door and the adjacent car frame, so that the main, elongated portion 40' cannot be stolen.

In either unit 10 or 40, the main, elongated portion 12 or 40' is preferably provided with a series of shallow, V-shaped cutouts, or notches, 70 extending across the entire width of the front surface-face of the front layer, and a like series of shallow, V-shaped cutouts, or notches, 72 extending across the width of the rear surface-face of the rear layer. Preferably, the notches 70 or 72 are spaced apart from between ½ inch to two inches along the length of the portion. These notches, or grooves, 70, 72 provide additional flexibility to the two layers of the unit, by serving as strain-relief lines about which the layers will bend, so that, when they are rolled up for storage, the layers do not crack or become malformed, and for increasing the life, and enhancing the appearance of the layers during its lifetime.

While a specific embodiment of the invention has been shown and described, it is to be understood that numerous changes and modifications may be made therein without departing from the scope, spirit, and intent of the invention as set forth in the appended claims.

What we claim is:

1. In a magnetic, car-door protector comprising an elongated strip having a first end and a second end, and at least partially made of magnetic material for attachment to a vehicle door for protecting the vehicle door against nicks and scratches, the improvement comprising:
    a theft-protection member operatively associated with said elongated strip, said theft-protection member being received between an edge of the vehicle door and a vehicle frame for preventing theft of the protector;
    said elongated strip comprising a front surface-face and a rear surface-face, and a plurality of grooves formed in each said surface-face, in order to provide additional flexibility to said elongated strip for better storage thereof, and for relieving strain in said strip during storage.

2. In a magnetic, car-door protector according to claim 1, wherein said theft-protection member comprises a terminal, end-flap member having a first end and a second end, said first end of said terminal, end-flap member being connected to said second end of said elongated strip, and said second end of said terminal, end-flap member being free of connection; said first end of said terminal, end-flap member being flexibly connected to said second end of said elongated strip.

3. In a magnetic, car-door protector according to claim 1, wherein said elongated strip is made of two layers: a first, inner layer made at least partially of magnetic material, and a second, outer layer made of flexible, shock-absorbing material.

4. In a magnetic, car-door protector according to claim 1, wherein said elongated strip is made of two layers: a first, inner layer made of magnetic material, and a second, outer layer made of flexible, shock absorbing material, said front surface-face being part of said second, outer layer, and said rear surface-face being part of said first, inner layer.

5. In a magnetic, car-door protector according to claim 1, wherein said theft-protection member comprises a slidable member slidably mounted on said elongated strip; said slidable member comprising a first section that slidably receives therethrough a portion of said elongated strip for relative sliding movement therebetween, and a second, door-edge engaging section connected to said first section; said second section comprising a door-edge receiving well-portion that receives therein a portion of the edge of the vehicle door; said first and second ends of said elongated strip being enlarged for preventing passage thereof through said first section, whereby said second section prevents said strip from being removed from a vehicle while the door of the vehicle is closed.

6. In a magnetic, car-door protector according to claim 5, wherein said second section of said theft-protection member comprises three walls forming an interior, hollow volume, and an entrance into said interior, hollow volume, said entrance and said interior, hollow volume receiving therein the portion of the edge of the vehicle door.

7. In a magnetic, car-door protector according to claim 5, wherein said theft-protection member is made of flexible material.

8. In an automobile having a magnetic, car-door protector for at least one side door thereof comprising an elongated strip having a first end and a second end, and at least partially made of magnetic material for attachment to the side door for protecting the door against nicks and scratches, the improvement comprising:
    a theft-protection member operatively associated with said elongated strip, said theft-protection member being received between an edge of the door and a vehicle frame for preventing theft of the protector;
    said elongated strip comprising a front surface-face and a rear surface-face, and a plurality of notches formed in each said surface-face, in order to provide additional flexibility to said elongated strip for better storage thereof, and for relieving strain in said strip during storage.

9. In an automobile according to claim 8, wherein said theft-protection member comprises a terminal, end-flap member having a first end and a second end, said first end of said terminal, end-flap member being connected to said second end of said elongated strip, and said second end of said terminal, end-flap member being free of connection; said first end of said terminal, end-flap member being flexibly connected to said second end of said elongated strip.

10. In an automobile according to claim 8, wherein said theft-protection member comprises a slidable member slidably mounted on said elongated strip; said slidable member comprising a first section that slidably receives therethrough a portion of said elongated strip for relative sliding movement therebetween, and a second, door-edge engaging section connected to said first section; said second section comprising a door-edge receiving well-portion that receives therein a portion of the edge of the door; said first and second ends of said elongated strip being enlarged for preventing passage thereof through said first section, whereby said second section prevents said strip from being removed from the automobile while the door of the automobile is closed.

11. In an automobile according to claim 10, wherein said second section of said theft-protection member comprises three walls forming an interior, hollow volume, and an entrance into sad interior, hollow volume, said entrance and said interior, hollow volume receiving therein the portion of the edge of the door.

12. A method of using a magnetic, car-door protector comprising an elongated strip having a first end and a second end, and at least partially made of magnetic material for attachment to a vehicle door for protecting the vehicle door against nicks and scratches, a theft-protection member operatively associated with said elongated strip, said theft-protection member being received between an edge of the vehicle door and a vehicle frame for preventing theft of the protector, said strip of said car-door protector further comprising a front surface-face and a rear surface-face, and a plurality of shallow, spaced-apart depressions formed in each said surface-face, in order to provide additional flexibility to said elongated strip for better storage thereof, and for relieving strain in said strip during storage, said method comprising:

(a) securing said elongated strip to the vehicle door to be protected;
(b) inserting said theft-protection member against the edge of the door being protected while the door is opened;
(c) closing the door and lockably securing the theft protection member thereby by sandwiching it between the edge of the door and another vehicle portion juxtapositioned opposite to the door edge;
(d) opening the door being protected, and removing said strip therefrom, and
(e) rolling up the strip for storage; said step of rolling up comprising bending the strip at those portions thereof in which are formed said shallow, spaced-apart depressions.

13. In a magnetic, car-door protector comprising an elongated strip having a first end and a second end, and at least partially made of magnetic material for attachment to a vehicle door for protecting the vehicle door against nicks and scratches, the improvement comprising:

a theft-protection member operatively associated with said elongated strip, said theft-protection member being received between an edge of the vehicle door and a vehicle frame for preventing theft of the protector;
said theft-protection member comprising a slidable member slidably mounted on said elongated strip; said slidable member comprising a first section that slidably receives therethrough a portion of said elongated strip for relative sliding movement therebetween, and a second, door-edge engaging section connected to said first section; said second section comprising a door-edge engaging portion that receives thereagainst a portion of the edge of the vehicle door;
said elongated strip having first and second means for preventing passage of said first and second ends of said elongated strip through said first section, whereby said second section prevents said strip from being removed from a vehicle while the door of the vehicle is closed.

14. In a magnetic, car-door protector according to claim 13, wherein said second section of said theft-protection member comprises three walls forming an interior, hollow volume, and an entrance into said interior, hollow volume, said entrance and said interior, hollow volume receiving therein the portion of the edge of the vehicle door.

15. In a magnetic, car-door protector according to claim 13, wherein said first and second means for preventing passage of said first and second ends of said elongated strip through said first section comprises enlarged said first and second ends of said elongated strip, each of said enlarged first and second ends having a size preventing the passage through said first section.

16. In a magnetic, car-door protector according to claim 13, wherein said elongated strip comprises a front surface-face and a rear surface-face, and a plurality of notches formed in each said surface-face, in order to provide additional flexibility to said elongated strip for better storage thereof, and for relieving strain in said strip during storage.

17. In an automobile having a magnetic, car-door protector for at least one side door thereof comprising an elongated strip having a first end and a second end, and at least partially made of magnetic material for attachment to the side door for protecting the door against nicks and scratches, the improvement comprising:

a theft-protection member operatively associated with said elongated strip, said theft-protection member being received between an edge of the door and a vehicle frame for preventing theft of the protector;
said theft-protection member comprising a slidable member slidably mounted on said elongated strip; said slidable member comprising a first section that slidably receives therethrough a portion of said elongated strip for relative sliding movement therebetween, and a second, door-edge engaging section connected to said first section; said second section comprising a door-edge engaging portion that receives thereagainst a portion of the edge of the door;
said elongated strip having first and second means for preventing passage of said first and second ends of said elongated strip through said first section, whereby said second section prevents said strip from being removed from the automobile while the door of the automobile is closed.

18. In an automobile according to claim 17, wherein said second section of said theft-protection member comprises three walls forming an interior, hollow volume, and an entrance into said interior, hollow volume, said entrance and said interior, hollow volume receiving therein the portion of the edge of the door.

19. In an automobile according to claim 17, wherein said first and second means for preventing passage of said first and second ends of said elongated strip through said first section comprises enlarged said first and second ends of said elongated strip, each of said enlarged first and second ends having a size preventing the passage through said first section.

* * * * *